(12) United States Patent
Schiedermeier et al.

(10) Patent No.: US 11,271,227 B2
(45) Date of Patent: *Mar. 8, 2022

(54) METHOD FOR OPERATING A FUEL CELL ARRANGEMENT AND A CORRESPONDING FUEL CELL ARRANGEMENT

(71) Applicant: AUDI AG, Ingolstadt (DE)

(72) Inventors: Maximilian Schiedermeier, Ingolstadt (DE); Martin Breu, Heilsbronn (DE)

(73) Assignee: AUDI AG, Ingolstadt (DE)

( * ) Notice: Subject to any disclaimer, the term of this patent is extended or adjusted under 35 U.S.C. 154(b) by 301 days.

This patent is subject to a terminal disclaimer.

(21) Appl. No.: 16/104,713

(22) Filed: Aug. 17, 2018

(65) Prior Publication Data
US 2019/0058202 A1 Feb. 21, 2019

(30) Foreign Application Priority Data
Aug. 18, 2017 (DE) .......................... 102017214440.8

(51) Int. Cl.
| | |
|---|---|
| *H01M 16/00* | (2006.01) |
| *H01M 8/04225* | (2016.01) |
| *H01M 8/04302* | (2016.01) |
| *H01M 8/04828* | (2016.01) |
| *H01M 8/04858* | (2016.01) |
| *B60L 50/71* | (2019.01) |

(52) U.S. Cl.
CPC ......... *H01M 8/04225* (2016.02); *B60L 50/71* (2019.02); *H01M 8/04302* (2016.02); *H01M 8/04917* (2013.01); *H01M 8/04932* (2013.01); *H01M 8/04947* (2013.01); *H01M 16/006* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,225,008 B1 * | 5/2001 | Kolb | ................... H01M 4/0416 429/233 |
| 6,321,145 B1 | 11/2001 | Rajashekara | |
| 6,612,385 B1 * | 9/2003 | Stuhler | ............. H01M 8/04225 180/65.31 |

(Continued)

FOREIGN PATENT DOCUMENTS

| | | |
|---|---|---|
| CN | 1475378 A | 2/2004 |
| CN | 100999191 A | 7/2007 |

(Continued)

*Primary Examiner* — Haroon S. Sheikh
(74) *Attorney, Agent, or Firm* — Seed IP Law Group LLP

(57) ABSTRACT

The invention relates to a method for operating a fuel cell arrangement which has a fuel cell for providing electrical energy in a circuit, at least one fuel cell auxiliary unit, the circuit electrically connected to the fuel cell via a DC-DC converter, and a battery. In this case, it is provided that, in order to place the fuel cell into operation, the battery be electrically connected to the circuit and the fuel cell auxiliary unit be operated with electrical energy drawn from the battery, wherein the battery is electrically disconnected from the circuit, and the DC-DC converter is operated in non-clocked mode in at least one operating mode of the fuel cell arrangement after placement into operation. The invention further relates to a fuel cell arrangement.

10 Claims, 1 Drawing Sheet

(56) References Cited

U.S. PATENT DOCUMENTS

| | | |
|---|---|---|
| 7,408,401 B1 | 8/2008 | Roberts |
| 2003/0201674 A1 | 10/2003 | Droppo et al. |
| 2005/0200998 A1 | 9/2005 | Rowan |
| 2007/0035408 A1 | 2/2007 | Roberts et al. |
| 2008/0036432 A1 | 2/2008 | Takada et al. |
| 2010/0173211 A1 | 7/2010 | Kim et al. |
| 2011/0032733 A1 | 2/2011 | Watanabe et al. |
| 2012/0326668 A1 | 12/2012 | Ballatine et al. |
| 2013/0038120 A1 | 2/2013 | Mimatsu et al. |
| 2015/0002407 A1 | 1/2015 | Knausz et al. |
| 2015/0207159 A1 | 7/2015 | Matsusue et al. |
| 2015/0229202 A1 | 8/2015 | Varigonda et al. |
| 2017/0033380 A1 | 2/2017 | Chung et al. |
| 2017/0203669 A1 | 7/2017 | Kato et al. |
| 2018/0007634 A1 | 1/2018 | Pereira |
| 2018/0251121 A1 | 9/2018 | Jorgensen et al. |
| 2018/0348270 A1 | 12/2018 | Karlsson et al. |
| 2019/0054839 A1 | 2/2019 | Schiedermeier et al. |

FOREIGN PATENT DOCUMENTS

| | | |
|---|---|---|
| CN | 101075745 A | 11/2007 |
| CN | 102648108 A | 8/2012 |
| CN | 104340082 A | 2/2015 |
| CN | 105313710 A | 2/2016 |
| CN | 106394266 A | 2/2017 |
| DE | 101 63 841 A1 | 7/2003 |
| DE | 10 2007 051 362 A1 | 4/2009 |
| DE | 20 2006 020 706 U1 | 7/2009 |
| DE | 11 2008 003 416 T5 | 10/2010 |
| DE | 11 2008 003 478 B4 | 8/2013 |
| DE | 10 2014 011 768 A1 | 2/2015 |
| DE | 10 2015 010 114 A1 | 3/2016 |
| DE | 10 2015 207 413 A1 | 10/2016 |
| EP | 0 972 668 A2 | 1/2000 |
| EP | 1 225 082 A2 | 7/2002 |
| EP | 2 226 878 A1 | 9/2010 |

\* cited by examiner

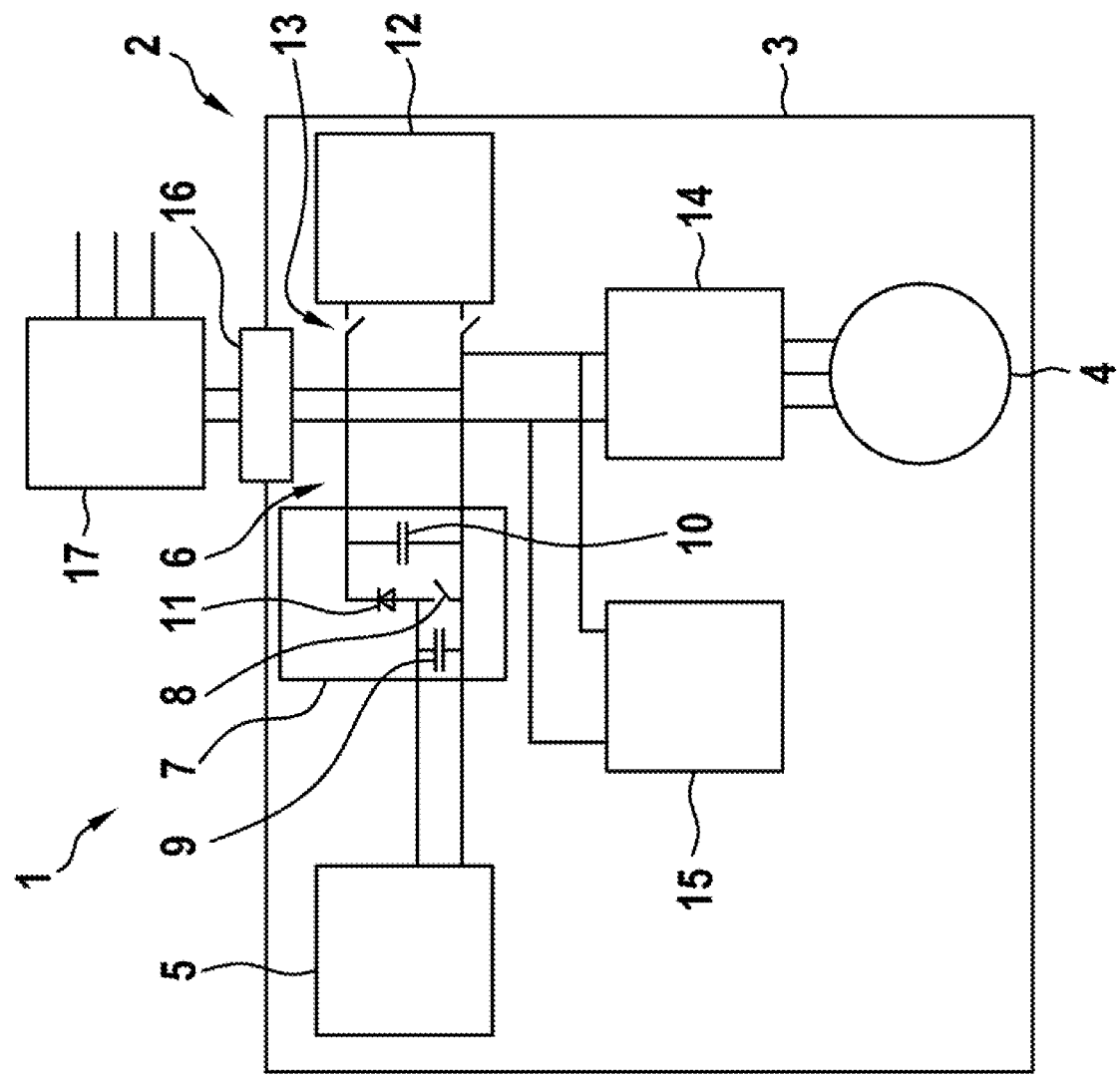

METHOD FOR OPERATING A FUEL CELL ARRANGEMENT AND A CORRESPONDING FUEL CELL ARRANGEMENT

BACKGROUND

Technical Field

The invention relates to a method for operating a fuel cell arrangement which has a fuel cell for providing electrical energy in a circuit, at least one fuel cell auxiliary unit, the circuit electrically connected to the fuel cell via a DC-DC converter, and a battery. The invention furthermore relates to a fuel cell arrangement.

Description of the Related Art

The fuel cell arrangement forms, for example, a component of a drive device for a motor vehicle. The drive device is used to drive the motor vehicle; to this extent, it thus provides a drive torque directed at driving the motor vehicle. The drive device has at least one drive unit which is preferably designed as an electric machine. In this case, the fuel cell arrangement serves to provide electrical energy for operating the electric machine.

The fuel cell arrangement comprises the fuel cell which serves to provide electrical energy or electric current for the circuit. The at least one fuel cell auxiliary unit and, additionally, preferably at least one consumer, e.g., a drive unit, are connected to the circuit. The circuit itself is connected electrically to the fuel cell via the DC-DC converter. Furthermore, the circuit is assigned the battery by means of which electrical energy or electric current—in particular, electrical energy provided by the fuel cell—can be temporarily stored.

Document DE 10 2007 051 362 A1, for example, is known from the prior art. This document relates to a motor vehicle with a fuel cell system, a DC-AC converter coupled with the fuel cell system, and an interface, coupled with the DC-AC converter, for supplying a vehicle-independent electricity consumer with electrical energy, wherein the interface can be accessed from the outer area of the motor vehicle when the vehicle doors, windows, vehicle roof, and trunk are closed.

BRIEF SUMMARY

It is an aim of the invention to provide a method for operating a fuel cell arrangement which has advantages over known methods—in particular, enables operation of the fuel cell arrangement with higher efficiency.

This is achieved according to the invention by a method for operating a fuel cell arrangement having the features of claim 1. In this case, it is provided that, in order to place the fuel cell into operation, the battery be electrically connected to the circuit, and the fuel cell auxiliary unit be operated with electrical energy drawn from the battery, wherein the battery is electrically disconnected from the circuit, and the DC-DC converter is operated in non-clocked mode in at least one operating mode of the fuel cell arrangement after placement into operation.

Electrical energy is required in order to place the fuel cell into operation—in particular, to start and/or operate the fuel cell auxiliary unit. The fuel cell auxiliary unit is present, for example, in the form of a fluid pump by means of which fuel and/or an oxidizer—in particular, atmospheric oxygen—is fed or at least can be fed to the fuel cell. The fuel cell auxiliary unit is connected to the circuit, as is the battery.

For placing the fuel cell into operation, the battery is to be electrically connected to the circuit, and the fuel cell auxiliary unit is now to be operated first, in order to place the fuel cell into operation. In so doing, the fuel cell makes no contribution to supplying the fuel cell auxiliary unit with electrical energy. Instead, the electrical energy needed to operate the fuel cell auxiliary unit is preferably drawn entirely and exclusively from the battery. Alternatively, it can also be provided for the electrical energy to be provided at least partially or fully by recuperation—in particular, by means of a traction machine. It can thus be provided, for example, that the energy be in part drawn from the battery and in part supplied by the traction machine.

When the fuel cell auxiliary unit has been placed into operation, the fuel cell is also placed into operation in order to then provide electrical energy for the circuit. The fuel cell is electrically connected to the circuit, viz., via the DC-DC converter. The DC-DC converter serves to convert the fuel cell voltage provided by the fuel cell to the circuit voltage present in the circuit, which normally corresponds to a battery voltage of the battery, at least while the battery is electrically connected to the circuit. For example, the battery voltage is always higher than the fuel cell voltage. For example, the battery voltage is at least 250 V, at least 275 V, at least 300 V, at least 325 V, or at least 350 V. The fuel cell voltage is in each case less than the respective battery voltage.

The difference between the fuel cell voltage and the battery voltage is compensated for by the DC-DC converter, wherein the DC-DC converter, for example, operates as a charge pump. The DC-DC converter has at least one circuit-breaker which is periodically opened and closed to convert the voltage. In this case, the DC-DC converter is operated in switched mode, i.e., opened and closed with a specific cycle time.

Operation of the DC-DC converter in switched mode implies a loss of efficiency of the fuel cell arrangement. At the same time, however, this is necessary in order to connect the battery and the fuel cell to the circuit simultaneously. In order to increase the efficiency of the fuel cell arrangement, it is therefore provided in the at least one mode of operation that the battery be disconnected electrically from the circuit, and the DC-DC converter be operated in non-clocked mode after the fuel cell has been placed into operation. Consequently, the voltage present in the circuit corresponds to the fuel cell voltage, or at least approximately to the fuel cell voltage. For example, it corresponds to the fuel cell voltage minus a voltage lost via the diode.

The procedure described is, in particular, expedient if the electrical energy provided by the fuel cell is not used to carry out a motor vehicle driving mode, but is rather to be used for operating a device external to the vehicle. The electrical power required for the operation of this device is usually so low that it does not result in a drop in the fuel cell voltage, and, consequently, in the circuit voltage. It is therefore possible, without further measures, to operate the DC-DC converter in non-clocked mode and to supply the external device with electrical energy solely with the aid of the fuel cell.

Another embodiment of the invention provides that, before and/or during the placement into operation, the DC-DC converter be operated such that its output voltage corresponds to a battery voltage of the battery. It was already mentioned above that, initially, the battery is electrically connected to the circuit and the fuel cell is placed into operation, in order to place the fuel cell into operation. This means that the fuel cell voltage provided by the fuel cell is less than the circuit voltage that depends upon the battery voltage. The DC-DC converter is therefore operated such that its output voltage corresponds to the circuit voltage and, accordingly, to the battery voltage, so that the fuel cell voltage provided by the fuel cell is converted thereto. For this purpose, the DC-DC converter is preferably operated in clocked mode so that the aforementioned circuit-breaker is thus periodically opened and closed. This allows for easily placing the fuel cell into operation.

In the context of a further embodiment of the invention, it is provided that, after placement into operation, the DC-DC converter be operated such that a battery current of the battery is less than a threshold value, and the battery be subsequently disconnected from the circuit. The lower the battery current, the less problematically the battery can be disconnected from the circuit. For this reason, before disconnection of the battery from the circuit, the DC-DC converter is to be operated in such a way that the battery current, which is drawn from the battery in the direction of the circuit, is as small as possible—in particular, less than the threshold value, or equal to zero.

To this end, the DC-DC converter is, for example, operated such that its output voltage at least corresponds to the battery voltage of the battery or is equal thereto. When the battery current has been reduced in this way—preferably, to zero—the battery is disconnected from the circuit so that the circuit is now supplied with electrical energy from the fuel cell via the DC-DC converter. This disconnection of the battery from the circuit makes possible the subsequent operation of the DC-DC converter in non-clocked mode.

A further preferred embodiment of the invention provides that the DC-DC converter be operated in the circuit, after placement into operation, in order to provide a first voltage, and, after disconnection of the battery from the circuit, in order to provide a second voltage different from the first voltage. While the battery is connected to the circuit, the DC-DC converter should provide the first voltage on the side of the circuit so that, in other words, the output voltage of the DC-DC converter corresponds to the first voltage. After disconnection of the battery from the circuit, the output voltage of the DC-DC converter is to correspond to the second voltage. The second voltage is preferably lower than the first voltage, and is thus lower than the battery voltage. The second voltage is realized by operation of the DC-DC converter in non-clocked mode, whereby the efficiency of the fuel cell arrangement is improved.

A development of the invention provides that the DC-DC converter have a circuit-breaker that can be operated in clocked mode, is operated in clocked mode after placement into operation, and is open after the battery is disconnected from the circuit. Reference has already been made to the circuit-breaker of the DC-DC converter. This circuit-breaker can be operated in clocked mode, i.e., be opened and closed periodically. While the DC-DC converter is operating in non-switched mode, the circuit-breaker preferably remains permanently open. The design of the DC-DC converter with the circuit-breaker enables the fuel cell arrangement to be operated not only with the battery connected to the circuit, but also with the battery electrically disconnected from the circuit, wherein in the latter case, extremely energy-efficient operation is realized.

A further embodiment of the invention provides that, while the DC-DC converter is operating in non-clocked mode, the fuel cell be connected to the circuit via a diode of the DC-DC converter. The diode takes the form of a blocking diode, and its forward direction is from the fuel cell towards the circuit. Conversely, its blocking direction is therefore from the circuit towards the fuel cell. Electrical energy from the fuel cell thus reaches the circuit via the diode, provided the fuel cell voltage is higher than the circuit voltage. During operation in non-switched mode, the fuel cell is connected to the circuit exclusively via the diode—in other words, solely by a passive electrical component. The aforementioned circuit-breaker does, however, remain permanently open.

In the context of another preferred embodiment of the invention, it is provided that electrical energy be provided in the at least one operating mode by means of an inverter connected to the circuit. The electrical energy is preferably provided in the form of an alternating current and, for example, serves to operate the aforementioned device external to the vehicle. Very generally, however, any consumer can be operated with the electrical energy. The inverter provides any number of phases on the output side—for example, two phases or three phases. To this extent, the energy-efficient operation of the fuel cell arrangement serves to operate the consumer or the device external to the vehicle. In the at least one operating mode, however, the drive unit is preferably deactivated, i.e., no electrical energy is applied to it.

A further embodiment of the invention provides that, in a further operating mode which differs from the operating mode of the fuel cell arrangement, the battery be electrically connected to the circuit, and the DC-DC converter be operated in clocked mode, wherein electrical energy provided by the fuel cell and/or the battery is used to operate a traction machine. The traction machine represents the aforementioned drive unit. While the traction machine is preferably deactivated in the at least one operating mode, it is operated in the further operating mode by supplying electrical energy to it. The electrical energy is provided either by the fuel cell, the battery, or both. To this end, the DC-DC converter is operated in clocked mode in order to convert the fuel cell voltage to the battery voltage, and thus to the circuit voltage.

Lastly, it can be provided, in the context of another preferred embodiment, that the traction machine be supplied with electrical energy from the circuit via a pulse inverter. The pulse inverter is preferably provided in addition to the aforementioned inverter. The pulse inverter serves to supply the traction machine with electrical energy. The fuel cell arrangement can to this extent be operated extremely flexibly; it can, in particular, be operated with high efficiency in the non-clocked mode of the DC-DC converter and can, in clocked mode, serve to supply the traction machine with electrical energy.

The invention furthermore relates to a fuel cell arrangement—in particular, for implementing the method in accordance with the foregoing embodiments—wherein the fuel cell arrangement has a fuel cell for providing electrical current in a circuit, at least one fuel cell auxiliary unit, the circuit electrically connected to the fuel cell via a DC-DC converter, and a battery. In this case, it is provided that the fuel cell arrangement be designed to electrically connect the battery to the circuit and to operate the fuel cell auxiliary unit with electrical energy drawn from the battery in order to place the fuel cell into operation, wherein the battery is electrically disconnected from the circuit, and the DC-DC converter is operated in non-clocked mode in at least one operating mode of the fuel cell arrangement after placement into operation.

The advantages of such a procedure or such an embodiment of the fuel cell arrangement have already been discussed. Both the fuel cell arrangement and the method of operating it can be further developed in accordance with the foregoing embodiments, which are accordingly referenced.

BRIEF DESCRIPTION OF THE DRAWING

The invention is explained in more detail below with reference to the exemplary embodiments shown in the drawing, without any limitation of the invention ensuing. The single FIGURE shows a schematic representation of a fuel cell arrangement.

The FIGURE shows a schematic representation of a fuel cell arrangement 1, for example, as part of a drive device 2 of a vehicle 3, which is only implied here. The drive device 2 has a traction machine 4, to which electrical energy can be applied in order to provide a drive torque directed at driving the motor vehicle 3. The electrical energy is provided here by means of the fuel cell arrangement 1.

DETAILED DESCRIPTION

The fuel cell arrangement 1 has a fuel cell 5, which serves to provide electrical energy in a circuit 6. The fuel cell 5 is connected via a DC-DC converter 7 to the circuit 6. The DC-DC converter 7 has at least one circuit-breaker 8, an input-side capacitor 9, an output-side capacitor 10, and also a diode 11. The forward direction of the diode 11 is from the fuel cell 5 towards the circuit 6. In addition, a battery 12 is connected to the circuit 6, viz., via one or more switching devices 13. By means of the switching device 13, the battery 12 can optionally be disconnected from the circuit 6 or electrically connected to it. The switching device 13 may, for example, be configured as a contactor.

Furthermore, the traction machine 4 is connected via a pulse inverter 14 to the circuit 6. In addition, at least one fuel cell auxiliary unit 15, i.e., exactly one fuel cell auxiliary unit 15 or a plurality of fuel cell auxiliary units 15, is connected electrically to the circuit 6. Via an interface 16, an inverter 17 can also be connected to the circuit 6, said inverter serving to supply electrical energy—in particular, in the form of an alternating current, for example—to a device external to the vehicle, which is not shown here.

In order to place the fuel cell 5 into operation, it is now provided to first electrically connect the battery 12 to the circuit 6, viz., by closing the clocking device 13. The fuel cell auxiliary unit 15 is operated next, wherein the electrical energy needed to operate the fuel cell auxiliary unit 15 is drawn from the battery 12. The fuel cell 5 is then placed into operation. Once this has been done, i.e., a steady-state operation of the fuel cell 5 has been achieved, the battery 12 is to be disconnected from the circuit 6, viz., by opening the clocking device 13.

In addition, the DC-DC converter 7 is to be operated in non-clocked mode, i.e., the circuit-breaker 8 is to be permanently open. The circuit 6 is thus electrically connected to the fuel cell 5 only via the diode 11. After disconnection of the battery 12 from the circuit 6, the fuel cell auxiliary unit 15 is operated solely by means of the electrical energy provided by the fuel cell 5. This also applies to the operation of the inverter 17 or the device external to the vehicle.

The described embodiment of the fuel cell arrangement 1 makes it possible, without further measures, to, for one thing, operate the traction machine 4 in order to carry out a driving mode of the motor vehicle 3, wherein, here, the battery 12 is electrically connected to the circuit 6, and the fuel cell 5 is operated to supply electrical energy. In this operating mode, the DC-DC converter 7 is operated in clocked mode, i.e., the circuit-breaker 8 is opened and closed periodically. If the traction machine 4 is, however, not to be operated, the above-described procedure is realized in order to increase the efficiency of the fuel cell arrangement 1, i.e., the battery 12 is disconnected from the circuit 6, and the DC-DC converter 7 is operated in non-clocked mode. In this way, the consumer external to the vehicle can be supplied with electrical energy via the inverter 17 in a particularly efficient manner.

In total, the method according to this description comprises several steps. The first step provides for the DC-DC converter 7 to be operated in such a way that the battery current of the battery 12 is less than a threshold value—in particular, is equal to zero. Once this state is reached, the battery 12 is disconnected from the circuit 6, viz., by opening the at least one switching device 13 or, in the case of the described embodiment, the plurality of switching devices 13.

After disconnection of the battery 12 from the circuit 6, the output voltage of the DC-DC converter 7 and therefore the voltage in the circuit 6 is set in a second step to the fuel cell voltage over a certain period of time—preferably, continuously. Depending upon the power that must be provided by the circuit 6—in particular, in order to operate the at least one fuel cell auxiliary unit 15 and/or the consumer external to the vehicle—the fuel cell voltage is reduced here from a higher voltage—in particular, the open-circuit voltage of the fuel cell 5—to a lower operating voltage. The voltage in the circuit 6 is preferably corrected to this lower voltage by means of the DC-DC converter 7—in particular, continuously. In other words, an adjustment of the required power—in particular, the power required by the fuel cell auxiliary unit 15 and/or the consumer external to the vehicle—is provided by means of the DC-DC converter 7. In this case, the DC-DC converter 7 is operated in clocked mode.

When the voltage in the circuit 6 equals the fuel cell voltage, the DC-DC converter 7, in a third step, is subsequently operated in non-clocked mode, so that efficient operation of the fuel cell arrangement 1 is realized.

The invention claimed is:

1. A method for operating a fuel cell arrangement, comprising:
    electrically connecting a battery to a circuit;
    operating a fuel cell auxiliary unit by supplying electrical energy from the battery;
    placing a fuel cell in operation with the fuel cell auxiliary unit;
    electrically connecting the circuit to the fuel cell via a DC-DC converter;
    operating the DC-DC converter in a clocked mode while the battery is electrically connected to the circuit;
    providing electrical energy to the circuit via the fuel cell;
    after placement of the fuel cell into operation:
        electrically disconnecting the battery from the circuit; and
        operating the DC-DC converter in a non-clocked mode while the battery is electrically disconnected from the circuit.

2. The method according to claim 1, comprising, before and/or during placement into operation of the fuel cell, operating the DC-DC converter such that an output voltage of the DC-DC converter corresponds to a battery voltage of the battery.

3. The method according to claim 1, comprising:
    after placement of the fuel cell into operation:

operating the DC-DC converter such that a battery current of the battery is less than a threshold value; and disconnecting the battery from the circuit if the battery current of the battery is less than the threshold value.

4. The method according to claim 1, comprising:
after placement of the fuel cell into operation:
operating the DC-DC converter to provide a first voltage; and
after disconnecting the battery from the circuit, operating the DC-DC converter to provide a second voltage that differs from the first voltage.

5. The method according to claim 1, comprising, while operating the DC-DC converter in the non-clocked mode, connecting the fuel cell to the circuit via a diode of the DC-DC converter.

6. The method according to claim 1, comprising supplying electrical energy to an external device by an inverter connected to the circuit at least while the DC-DC Converter is operating in the non-clocked mode.

7. The method according to claim 1, comprising supplying electrical energy from the circuit to a traction machine via a pulse inverter.

8. A fuel cell arrangement operable in at least a first mode of operation, the fuel cell arrangement comprising:
a circuit;
a fuel cell for providing electrical energy in the circuit;
at least one fuel cell auxiliary unit;
a DC-DC converter that electrically connects the fuel cell to the circuit;
a battery;
a switching device configured to selectively electrically connect and disconnect the battery from the circuit, wherein the fuel cell arrangement is configured to:
operate the fuel cell auxiliary unit with electrical energy drawn from the battery in order to place the fuel cell into operation;
operate the fuel cell in a clocked mode while the battery is electrically connected to the circuit by the switching device; and
after placement of fuel cell into operation, electrically disconnect the battery from the circuit and operate the DC-DC converter in a non-clocked mode while the battery is disconnected from the circuit by the switching device.

9. The fuel cell arrangement of claim 8, comprising:
a pulse inverter, the pulse inverter configured to supply electrical energy from the circuit to a traction machine.

10. The fuel cell arrangement of claim 8, wherein the DC-DC converter includes a diode, the diode configured to connect the circuit to the fuel cell.

* * * * *